July 6, 1926.
H. B. JOHNSTON
PISTON AND PISTON RING
Filed August 16, 1920
1,591,836
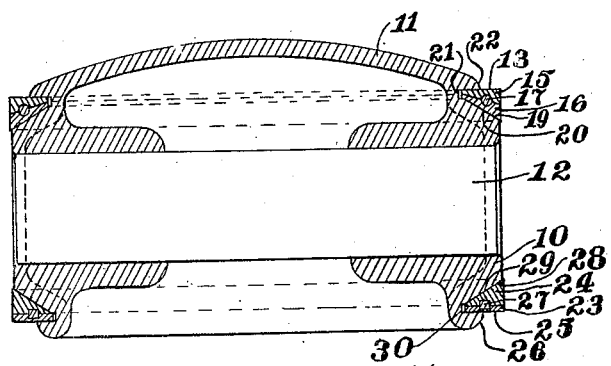
Fig.1
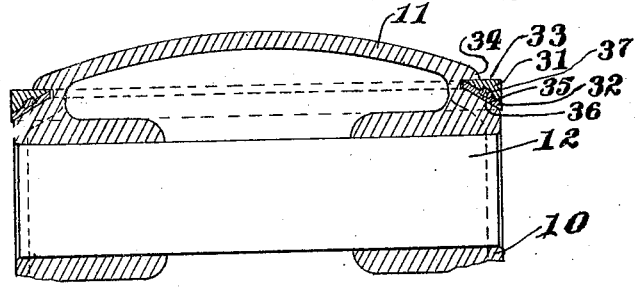
Fig.2
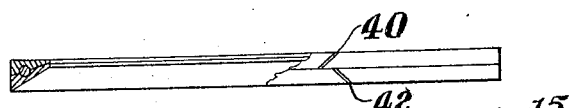
Fig.3
Fig.4
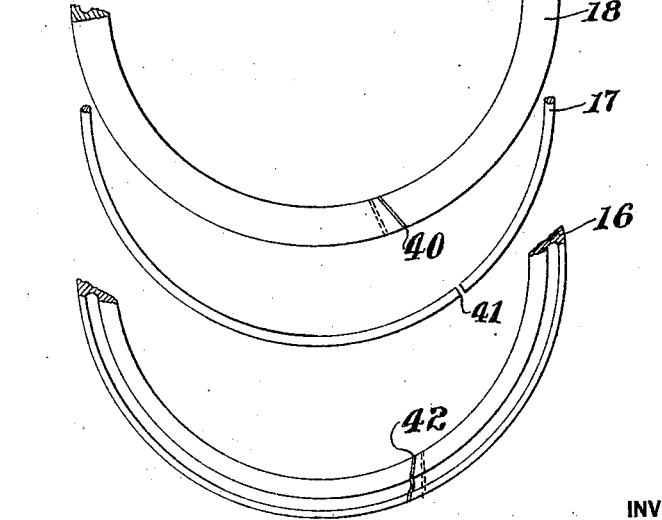
Fig.5
Fig.6
INVENTOR
*Harry B. Johnston*
BY
*Walter W. Burns*
ATTORNEY Patented July 6, 1926.

1,591,836

UNITED STATES PATENT OFFICE.

HARRY B. JOHNSTON, OF SEATTLE, WASHINGTON.

PISTON AND PISTON RING.

Application filed August 16, 1920. Serial No. 403,657.

My invention relates to pistons and piston rings and particularly to those pistons and piston rings in fluid engines where it is essential to provide a tight seal between the piston and cylinder wall.

One of the objects of my invention is the provision of a piston and ring construction wherein the piston is provided with a cut away portion between the groove and the end of the cylinder, the ring being provided with an inclined wall and comprising a plurality of ring sections locked together by suitable locking means such as a ring.

Another object of my invention is the provision of a piston ring having an inclined wall, the ring comprising a plurality of ring sections being locked together by suitable locking means such as a ring.

Referring now to the drawing where preferred embodiments are illustrated:

Figure 1 is a cross section of a piston showing two forms of my improved ring.

Figure 2 is a cross section of a piston showing another form of my improved ring.

Figure 3 is a side view of the ring shown in the upper groove of Figure 1.

Figures 4, 5 and 6 are views of the respective ring sections of the ring shown in the upper groove of Figure 1.

Like reference characters refer to similar parts in the several views.

10 designates the cylindrical portion of the piston, 11 the head thereof. 12 designates the wrist connection.

Referring now to Figures 1, 3, 4, 5 and 6, 15 and 16 are the upper and lower ring sections respectively as shown in Figure 1. The ring sections 15 and 16 have grooves of semi-circular cross section to receive the interlocking ring 17.

The outer surface of the ring section 15 is provided with a surface 18 which is here shown as being in a plane. The inner surface of the ring section 15 is inclined and in contact with a similarly inclined surface of the ring section. The outer surface 19 of the ring section 16 is inclined and in contact with the inclined wall 20 of the groove. A carbon space 21 is provided at the bottom of the groove. The piston head is cut away at 22 to permit the fluid under pressure to more readily reach the surface 18 of the ring.

Referring now to the ring in the lower groove of Figure 1, 23 and 24 are the ring sections. The outer side 25 of the ring section 23 is shown as being in a plane and exposed to the fluid pressure at the end of the piston due to the cut away portion as at 26. The inner side of the ring section 23 is shown as being parallel to the face 25 and in a plane. This inner side contacts with a similarly shaped face on the ring section 24. A ring 27 of rectangular cross section is provided to interlock the ring sections together and rests in grooves in the adjacent ring sections. The outer surface 28 of the ring section 24 is inclined and is in contact with the inclined surface 29 of the groove. A carbon space 30 is provided at the bottom of the groove.

Referring now to the upper portion of Figure 2, 31 and 32 designate the ring sections. The outer surface 33 of the ring section 31 is illustrated as being in a plane and is exposed to the fluid pressure at the end of the piston due to the cut away portion of the piston at 34. The outer face 35 of the ring section 32 is inclined relative to a plane perpendicular to the axis of the ring and contacts with a similarly shaped wall 36 of the groove. The adjacent faces of the ring sections are illustrated as being parallel to the inclined faces and each have a groove having outwardly diverging walls to receive a ring 37 of corresponding shape for locking the ring sections together.

The ring sections are split as illustrated at 40, 41 and 42 of the Figures 3, 4, 5 and 6. The particular form of split is not a part of my invention and any suitable split may be used.

The piston rings are preferably made having a greater radial thickness than axial thickness.

It will be noted that a ring made according to my invention will be very flexible and will accordingly be readily forced down the inclined wall of the groove and against the cylinder wall. The flexibility permits the rings to make and maintain a better seat on the inclined wall of the groove and with the cylinder wall.

While I have described my preferred forms in detail I desire to have it understood that modifications and changes may be made without departing from the spirit of my invention and within the scope of the appended claims.

Having described my invention what I claim is:

1. A piston ring having outwardly diverging surfaces and comprising a plurality of ring sections, grooves in adjacent sides of the ring sections, a locking ring in the grooves of the adjacent ring sections for preventing relative movement of the ring sections in a radial direction.

2. A piston ring having outwardly diverging surfaces, one of the surfaces having greater inclination that the other relative to a plane perpendicular to the axis of the ring, the ring comprising a plurality of ring sections, means separate from but contacting with the adjacent ring sections for preventing their relative movement in a radial direction.

3. A piston ring having an inclined surface on one side and a surface opposite the inclined surface and lying substantially in a plane, the ring comprising a plurality of ring sections, means separate from but contacting with the ring sections for limiting their relative movement in a radial direction.

4. A piston ring having outwardly diverging surfaces and comprising a plurality of ring sections, means separate from but contacting with the sections for limiting relative movement of the adjacent sections in a radial direction, the ring having a greater radial thickness than axial thickness.

5. A piston ring having outwardly diverging surfaces and comprising a plurality of ring sections, grooves in adjacent sides of the ring sections, means in the grooves of adjacent ring sections for limiting relative movement of the adjacent sections in a radial direction, the ring having a greater radial thickness than axial thickness.

6. A piston ring having an inclined wall and comprising a plurality of ring sections, grooves in adjacent sides of the ring sections, a ring in the grooves of adjacent ring sections for limiting relative movement of the adjacent sections in a radial direction, the ring having a greater radial thickness than axial thickness.

7. A piston ring having outwardly diverging surfaces, one of the surfaces having greater inclination than the other relative to a plane perpendicular to the axis of the ring, the ring comprising a plurality of ring sections, grooves in the adjacent sides of the ring sections, means in the grooves of adjacent ring sections for limiting relative movement of the adjacent sections in a radial direction, the ring having a greater radial thickness than axial thickness.

8. In combination, a piston having a groove with an inclined wall and a piston ring in the groove, the ring having an inclined surface in contact with the inclined wall and comprising a plurality of ring sections, grooves in adjacent sides of the ring sections, a locking ring in the grooves of adjacent ring sections for limiting relative movement of the adjacent sections in a radial direction, the piston ring having a greater radial thickness than axial thickness.

9. In combination, a piston having a groove with an inclined wall and a piston ring in the groove, the ring having outwardly diverging surfaces, one of which is in contact with the inclined wall of the groove, the ring comprising a plurality of ring sections, grooves in adjacent sides of the ring sections, a locking ring in the grooves of the adjacent ring sections for limiting their relative movement in a radial direction, the piston ring having a greater radial thickness than axial thickness.

10. In combination, a piston having a groove with an inclined wall and a ring in the groove, the ring having an inclined surface on one side and in contact with the inclined wall of the groove and having a surface opposite the inclined surface and lying subtantially in a plane, the ring comprising a plurality of ring sections, means separate from but contacting with the ring sections for limiting their relative movement in a radial direction, the ring having a greater radial thickness than axial thickness.

11. In combination, a piston having a groove with an inclined wall and a ring in the groove, the ring having outwardly diverging surfaces, one of which is in contact with the inclined wall, the ring comprising a plurality of ring sections, recesses in adjacent sides of the ring sections, means in the recesses of adjacent ring sections for limiting relative movement of the adjacent sections in a radial direction, the ring having a greater radial thickness than axial thickness.

In testimony whereof, I affix my signature.

HARRY B. JOHNSTON.